US012697948B1

(12) United States Patent
Davis

(10) Patent No.: US 12,697,948 B1
(45) Date of Patent: Aug. 4, 2026

(54) AUTOMATIC PARK BRAKE SYSTEM AND METHOD

(71) Applicant: Sean Christopher Davis, Powder Springs, GA (US)

(72) Inventor: Sean Christopher Davis, Powder Springs, GA (US)

( * ) Notice: Subject to any disclaimer, the term of this patent is extended or adjusted under 35 U.S.C. 154(b) by 63 days.

(21) Appl. No.: 18/412,381

(22) Filed: Jan. 12, 2024

Related U.S. Application Data

(60) Provisional application No. 63/438,601, filed on Jan. 12, 2023.

(51) Int. Cl.
B60T 7/12 (2006.01)
B60T 8/172 (2006.01)

(52) U.S. Cl.
CPC ............... B60T 7/12 (2013.01); B60T 8/172 (2013.01); *B60T 2201/06* (2013.01); *B60T 2201/10* (2013.01)

(58) Field of Classification Search
CPC ........ B60T 7/12; B60T 8/172; B60T 2201/06; B60T 2201/10
See application file for complete search history.

(56) References Cited

U.S. PATENT DOCUMENTS

| | | | | |
|---|---|---|---|---|
| 2,964,135 | A * | 12/1960 | Sand | B60T 1/005 188/69 |
| 6,287,236 | B1 | 9/2001 | Ishikawa | |

| | | | | |
|---|---|---|---|---|
| 9,511,756 | B2 * | 12/2016 | Nijakowski | B60T 17/221 |
| 10,351,119 | B2 | 7/2019 | Wolff et al. | |
| 11,292,440 | B2 * | 4/2022 | Koshiba | B60W 30/06 |
| 11,407,394 | B2 | 8/2022 | Hutchins et al. | |
| 2003/0221922 | A1 * | 12/2003 | Callow | B60T 7/12 303/89 |
| 2004/0163896 | A1 * | 8/2004 | Wang | B60T 11/046 188/162 |
| 2005/0155444 | A1 * | 7/2005 | Otaki | F16H 25/2454 74/89 |
| 2005/0225166 | A1 * | 10/2005 | Greenberg | B60T 13/746 188/162 |
| 2006/0157308 | A1 * | 7/2006 | Hartig | B60T 13/746 188/162 |

(Continued)

*Primary Examiner* — Carl C Staubach
(74) *Attorney, Agent, or Firm* — Mark C. Johnson; Johnson | Dalal

(57) ABSTRACT

An automatic park brake system, and an automatic park brake system method are provided. The system and the method are operably configured to prevent idle or unattended vehicles from rolling away and causing property damage and personal injury. The automatic park brake system comprises an automatic park brake controller (APBC); an automatic park brake actuator (APB actuator) operably connected to the APBC and configured to operate in response to commands from the APBC; an automatic park brake cable (APB cable) operably connected to the APB actuator and configured to be pushed and pulled by and in response to operation of the APB actuator; an equipment park brake system operatively connected to the APB cable and configured to be activated/deactivated in response to operation of the APB actuator; and an automatic park brake battery (APB Battery) power source. The automatic park brake (APB) method comprises four general steps as described herein.

3 Claims, 6 Drawing Sheets

(56)            References Cited

U.S. PATENT DOCUMENTS

| | | | | |
|---|---|---|---|---|
| 2007/0125608 | A1 | 6/2007 | Tarasinski et al. | |
| 2007/0170775 | A1* | 7/2007 | Uchimura | B60T 7/107 |
| | | | | 303/112 |
| 2007/0251774 | A1* | 11/2007 | Deutloff | B60T 7/107 |
| | | | | 188/156 |
| 2008/0053761 | A1* | 3/2008 | Yamamoto | B60T 8/885 |
| | | | | 340/457.3 |
| 2009/0176619 | A1* | 7/2009 | Inoue | B60T 1/005 |
| | | | | 477/96 |
| 2010/0211281 | A1* | 8/2010 | Baier-Welt | B60T 8/1764 |
| | | | | 701/70 |
| 2010/0217488 | A1* | 8/2010 | Nijakowski | B60W 10/10 |
| | | | | 701/48 |
| 2011/0202246 | A1 | 8/2011 | Lindsay et al. | |
| 2011/0272649 | A1* | 11/2011 | Thesier | B66F 9/06 |
| | | | | 254/1 |
| 2018/0148022 | A1* | 5/2018 | Misumi | B60T 17/221 |
| 2019/0337495 | A1 | 11/2019 | Ernst | |
| 2020/0189548 | A1* | 6/2020 | Kaplan, Jr. | B60T 1/062 |
| 2021/0024043 | A1 | 1/2021 | Friend et al. | |

* cited by examiner

AUTOMATIC PARK BRAKE SYSTEM AND METHOD

CROSS-REFERENCE TO RELATED APPLICATIONS

This application claims the benefit of U.S. Provisional Patent Application No. 63/438,601, filed on Jan. 12, 2023, which is incorporated by reference herein in its entirety.

FIELD OF THE INVENTION

The present invention relates generally to parking brake systems, and more particularly, to an automatic park brake system operably configured to prevent idle or unattended vehicles from rolling away and causing property damage and personal injury, and a method for its use.

BACKGROUND OF THE INVENTION

Particularly in industrial and commercial applications such as tractors and delivery vehicles, it is a common occurrence for vehicles to roll away, unattended, when they are left without the presence of the operator. In turn, such incidents cause property damage and personal injury that can have extensive, serious, and costly effects. Although the specific circumstances generally vary, idle or unattended vehicles tend to roll away when the operator is not physically present to steer and commandeer the vehicle. In one example, an operator is ejected from the vehicle, e.g., as the result of a vehicular accident or crash. Current vehicles will continue to move without stopping. In another example, an operator leaves the vehicle running, in drive or neutral, to run a quick errand, run inside a store, or grab something they forgot from their home. Current vehicles will often roll away.

Therefore, a need exists to overcome the problems with unattended vehicles.

Accordingly, there is need for a solution to at least one of the aforementioned problems. For instance, there is an established need for an automatic park brake system operably configured to prevent idle or unattended vehicles from rolling away and causing property damage and personal injury, and a method for its use.

SUMMARY OF THE INVENTION

The present invention is directed to an automatic park brake system and an automatic park brake method. The system and the method are operably configured to prevent idle or unattended vehicles from rolling away and causing property damage and personal injury. The automatic park brake system comprises an automatic park brake controller (APBC); an automatic park brake actuator (APB actuator) operably connected to the APBC and configured to operate in response to commands from the APBC; an automatic park brake cable (APB cable) operably connected to the APB actuator and configured to be pushed and pulled by and in response to operation of the APB actuator; an equipment park brake system operatively connected to the APB cable and configured to be activated/deactivated in response to operation of the APB actuator; and an automatic park brake battery (APB Battery) power source. The automatic park brake (APB) method comprises four general steps as described herein.

In a first implementation of the invention, the present invention provides an automatic park brake system operably configured to prevent an idle or unattended vehicle from rolling away. The automatic park brake system further comprises:

an automatic park brake controller (APBC);

an automatic park brake actuator (APB actuator) having a first retracted APB actuator position and a second extended APB actuator position, the APB actuator being configured to extend in response to a first command from the APBC from the first retracted APB actuator position to the second extended APB actuator position, and configured to retract in response to a second command from the APBC from the second extended APB actuator position to the first retracted APB actuator position;

an automatic park brake cable (APB cable) operably connected to the APB actuator, the APB cable being configured to be pushed and pulled by and in response to the movement of the APB actuator between a first retracted APB cable position and a second extended APB cable position;

an equipment park brake system operatively connected to the APB cable, wherein the equipment park brake system is configured to be activated and deactivated in response to movement of the APB actuator, wherein the equipment park brake system is activated in response to movement of the APB actuator from the second extended APB cable position to the first retracted APB cable position, and the equipment park brake system is configured to be deactivated in response to movement of the APB actuator from the first retracted APB cable position to the second extended APB cable position; and an automatic park brake battery (APB Battery) configured to provide power to the automatic park brake system.

In one aspect, the automatic park brake battery of the automatic park brake system comprises a dedicated battery configured to provide power to the automatic park brake system at all times.

In one aspect, the automatic park brake battery of the automatic park brake system comprises a vehicle battery and a vehicle capacitor.

In one aspect, the automatic park brake controller (APBC) of the automatic park brake system comprises an electronic control unit configured to process all inputs of the automatic park brake system (APB system) and carry out a plurality of commands to the automatic park brake actuator (APB actuator).

In another aspect, the automatic park brake controller (APBC) of the automatic park brake system may comprise any kind of electrical, mechanical or electromechanical control device.

In another aspect, the automatic park brake controller (APBC) of the automatic park brake system may comprise a custom printed circuit board with a microcontroller and various IO devices. Th controller may be any kind of computation device, nonlimiting examples of which may include PLCs, equipment integral controllers, or the like.

In another aspect, the automatic parking brake controller comprises one or more of a programmable logic controller, an integral electronic controller, and an electrical relay.

In a further aspect, the automatic park brake actuator (APB actuator) of the automatic park brake system is configured to apply force to a plurality of articulating components of the system, which in response actuate the equipment park brake system to generate a braking force.

In one aspect, the automatic park brake system further comprises a plurality of automatic park brake brackets (APB brackets) configured to support the plurality of articulating components of the system.

In another aspect, the plurality of automatic park brake brackets is configured to adapt the plurality of articulating components of the system to the equipment park brake system.

In a further aspect, the plurality of system components supported by the plurality of automatic park brake brackets comprises the automatic park brake actuator and the automatic park brake cable.

In another aspect, the automatic park brake actuator is selected from a hydraulic cylinder, a pneumatic cylinder, an electric solenoid, an electric motor, a fluid power transmission and combinations thereof.

In a further aspect, the automatic park brake actuator comprises an electronic parking brake control unit.

In another aspect, the automatic park brake cable (APB Cable) is configured to transfer force from the APB Actuator to the Equipment Park Brake System.

In one aspect, the automatic park brake cable further comprises at least one mechanical linkage.

In another aspect, the equipment park brake system of the automatic park brake system comprises a drum brake configured for attachment to a transmission tail shaft of a vehicle.

In another aspect, the equipment park brake system comprises a dedicated park brake system integral to the automatic park brake system.

In a further aspect, the equipment park brake system of the automatic park brake system comprises a vehicle primary braking system.

In one aspect, the automatic park brake system further comprises a system control panel. In another aspect, the system control panel comprises at least one LED error warning light.

In a second implementation, the present invention provides an automatic park brake method for using the automatic park brake system to prevent idle or unattended vehicles from rolling away and causing property damage and personal injury. In one aspect, the method comprises four general steps as described herein.

In one aspect, the automatic park brake system method configured to prevent an idle or unattended vehicles from rolling away and causing property damage and personal injury, comprises:

providing an automatic park brake system as described herein;

installing the automatic park brake system in a vehicle;

starting the automatic park brake system by initializing (starting) the automatic park brake system following an installation or a maintenance of the automatic park brake system to ensure the automatic park brake system is properly adjusted and operating within a set of operational specifications;

determining a status of a plurality of fundamental inputs, the plurality of fundamental inputs comprising:

whether the automatic park brake system is being manually activated via an operator input;

whether there is an operator input to deactivate the automatic park brake system and set the equipment park brake system to an "off" state;

whether the vehicle is turned on or off; and whether the automatic park brake controller (APBC) is in "Sleep Mode":

if the automatic park brake controller is in sleep mode, the automatic park brake remains in sleep mode and the automatic park brake system returns to the step of starting the automatic park brake system; and if the automatic park brake controller is not in sleep mode, the automatic park brake system proceeds to a next step of the method; and activating the automatic park brake system (APB system), by execution of a command from the automatic park brake controller (APBC) to actuate the automatic park brake actuator (APB actuator) by:

determining whether the vehicle is in motion;

if the vehicle is in motion activating the equipment park brake system in a phased manner, and if the vehicle is not in motion activating the equipment park brake system in a non-phased manner;

after the brake has been applied, performing a brake wear compensation; and determining whether a brake maintenance service is needed;

if the vehicle is on, monitoring the vehicle by determining whether the vehicle is in motion:

if it is determined the vehicle is in motion:

confirming whether the vehicle operator is in an operator position and activating an operator presence timer if the operator is not present;

if the operator presence timer detects an absence of the operator which has not exceeded a predetermined threshold the system will return to the step of starting the automatic park brake system; and if the operator presence timer detects an absence of the operator which has exceeded the predetermined threshold, the system indicates an error condition comprising an operator is not present;

following an error condition comprising an operator is not present, the system follows the steps for activating the automatic park brake system (APB system);

if it is determined the vehicle is not in motion;

determining whether the vehicle is in park or neutral gear;

if the vehicle is in park or neutral gear, activating a park or neutral timer configured to monitor an amount of time the vehicle remains in park or neutral gear;

if the park or neutral timer does not exceed a predetermined threshold of time, the automatic park brake system will take no further action; and if the park or neutral timer detects an amount of time which exceeds the predetermined threshold, the system indicates the vehicle has been in park or neutral longer than the predetermined threshold and determines whether the equipment park brake has already been applied;

if the equipment park brake has not yet been applied, the system follows the steps for activating the automatic park brake system; and if the equipment park brake has already been applied, the system returns to the step of starting the automatic park brake system;

if the vehicle is not in park or neutral gear, confirming whether the vehicle operator is in an operator position;

if the operator is present, the system determines whether the park brake has been activated: if the park brake has been activated, the system will deactivate the park brake; and if the park brake has not been activated, the system will return to the step of starting the automatic park brake system; and if the operator is not present: an error condition that the operator is not present and an error condition that the vehicle is not in park or neutral will be displayed by the system on a system operator panel;

the system determines whether the park brake has been activated: if the park brake has been activated, the system will return to the step of starting the automatic park brake system; if the equipment park brake has not yet been applied, the system follows the steps for activating the automatic park brake system.

In one aspect, the method further comprises:

the system determining the vehicle is in an "off" state and the vehicle is not in sleep mode; after determining the vehicle is in an "off" state and is not in sleep mode, the system determining whether the park brake has been activated;

if the park brake has been applied, the system monitoring by a sleep mode timer how long the vehicle has been "off" with the park brake already applied: if the sleep mode timer is below a threshold value, the system taking no further action; and if the sleep mode timer has exceeded the threshold, the system activating a sleep mode process configured to enable operation of the system in a reduced power consumption state to conserve energy of the automatic park brake battery;

if the park brake has not been applied, the system determining whether the vehicle is currently moving;

if it is determined the vehicle is in motion: determining whether the vehicle operator is in an operator position:

if the operator is in the operator position, the system taking no further action and returning to the step of starting the automatic park brake system; and if the operator is not in the operator position and the presence timer detects an absence of the operator has not exceeded a predetermined threshold, the system taking no further action and returning to the step of starting the automatic park brake system;

if the operator presence timer detects an absence of the operator which has exceeded the predetermined threshold, the system indicates an error condition comprising an operator is not present and follows the steps for activating the automatic park brake system (APB system);

if it is determined the vehicle is not in motion: determining whether the vehicle is in park or neutral gear;

if the vehicle is not in a park or neutral gear, indicating an error condition that the vehicle is not in a park or neutral gear, indicating an error condition that the vehicle is not set to a parked condition, and the system following the steps for activating the automatic park brake system; and if the vehicle is in a park or neutral gear, the system returning to the step of activating the automatic park brake system (APB system).

In one aspect, checking the vehicle motion, operator presence, and whether the vehicle is on may be performed in any order.

In one aspect, the step of initializing the automatic park brake system comprises an initialization routine further comprising one or more of the following steps:

determining if an automatic park brake system initialization mode is currently active;

if the initialization mode is active:

the automatic park brake controller (APBC) commanding the automatic park brake actuator (APB actuator) to actuate to a predetermined position and evaluating one or more of an amperage or a force required to achieve the predetermined position;

if the amperage and/or the force at the predetermined position are within the set of operational specifications, the system creating a set of operating set points associated with the predetermined position and exiting the initialization mode; and if an automatic park brake system error exists wherein the amperage and/or the force at the predetermined position are not within the set of operational specifications:

the automatic park brake controller remaining in the initialization mode until a service technician resolves an automatic park brake system issue causing the error; and after the automatic park brake system issue causing the error is resolved, the initialization mode is repeated.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. It is to be understood that the disclosed embodiments herein are merely exemplary of the invention, which can be embodied in various forms. All of the implementations described below are exemplary implementations provided to enable persons skilled in the art to make or use the embodiments of the disclosure and are not intended to limit the scope of the disclosure, which is defined by the claims.

Figure 1:
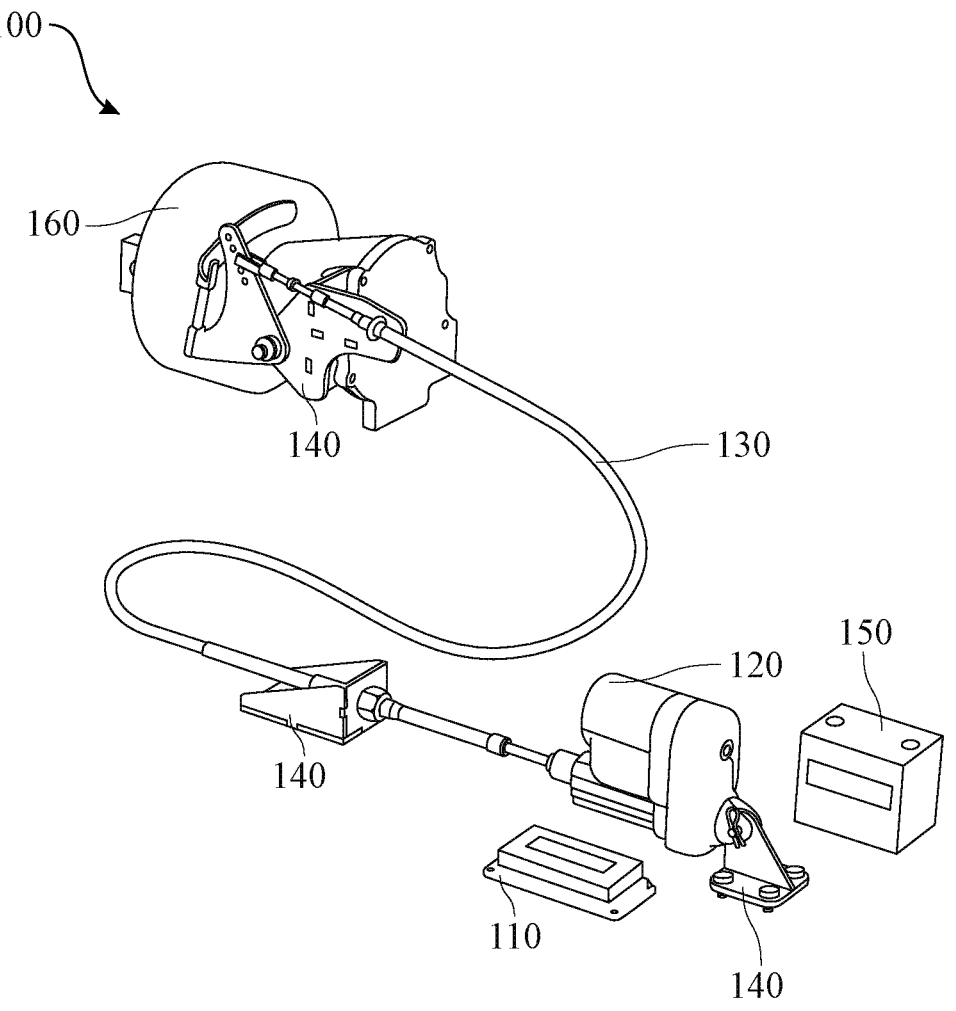
FIG. 1 is a left side perspective view of an automatic park brake system in accordance with an embodiment of the method and system of the present invention.
Figure 2:
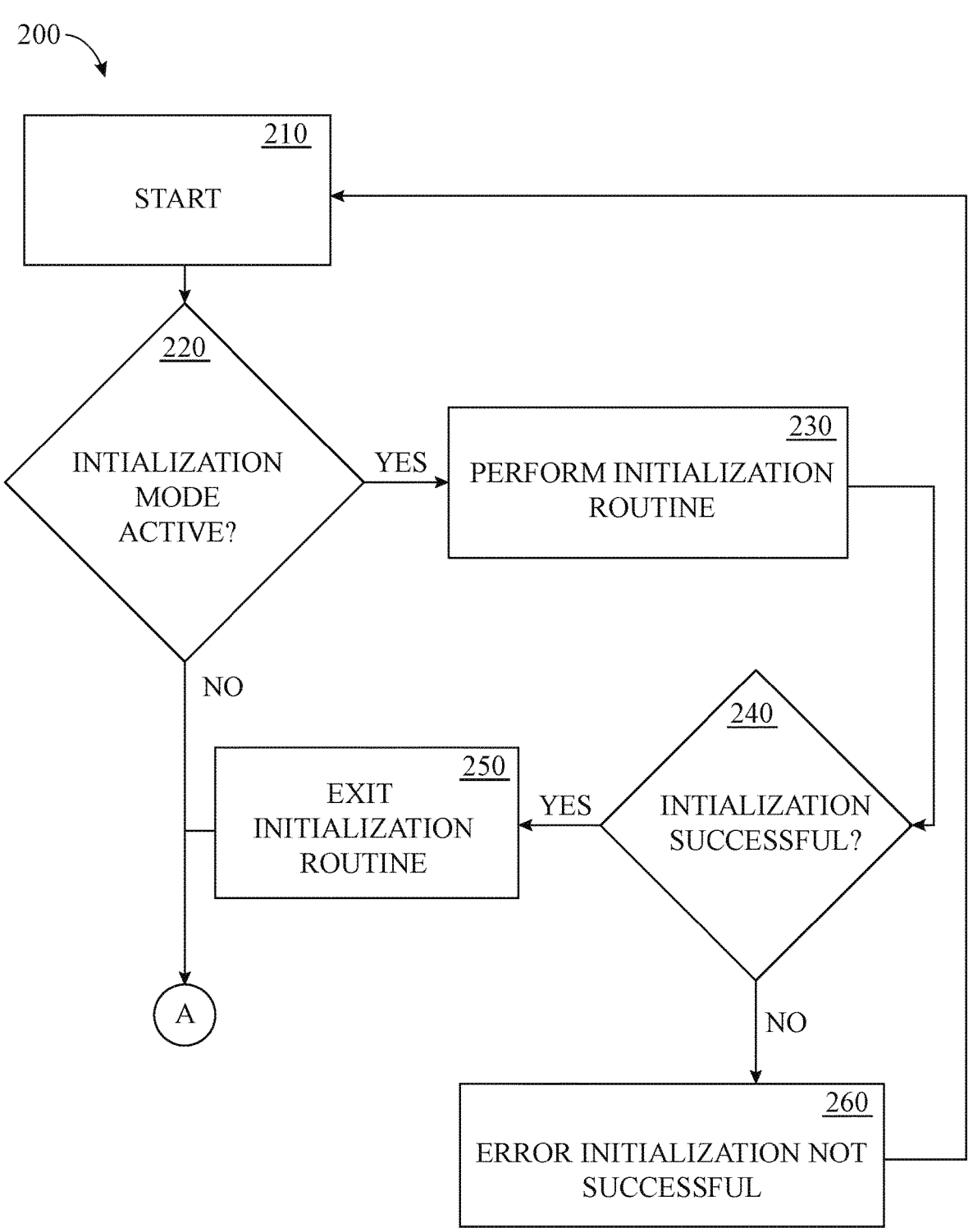
FIG. 2 presents a flowchart diagram of a First Step of an automatic park brake method and system, in accordance with an exemplary embodiment of the present invention.
Figure 3:
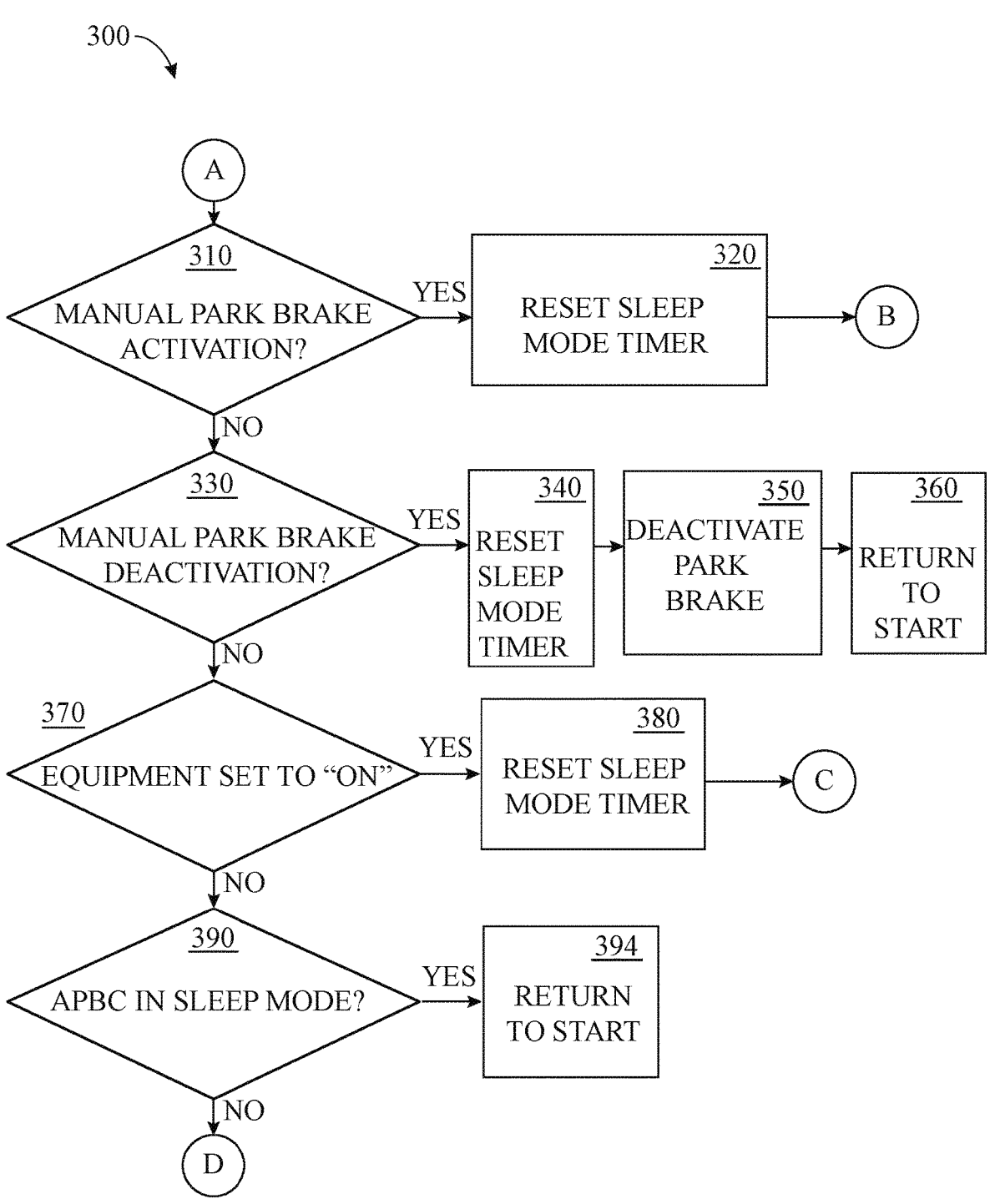
FIG. 3 is a flowchart diagram of a Second Step of the automatic park brake method and system according to FIG. 2, in accordance with the present invention.
Figure 4:
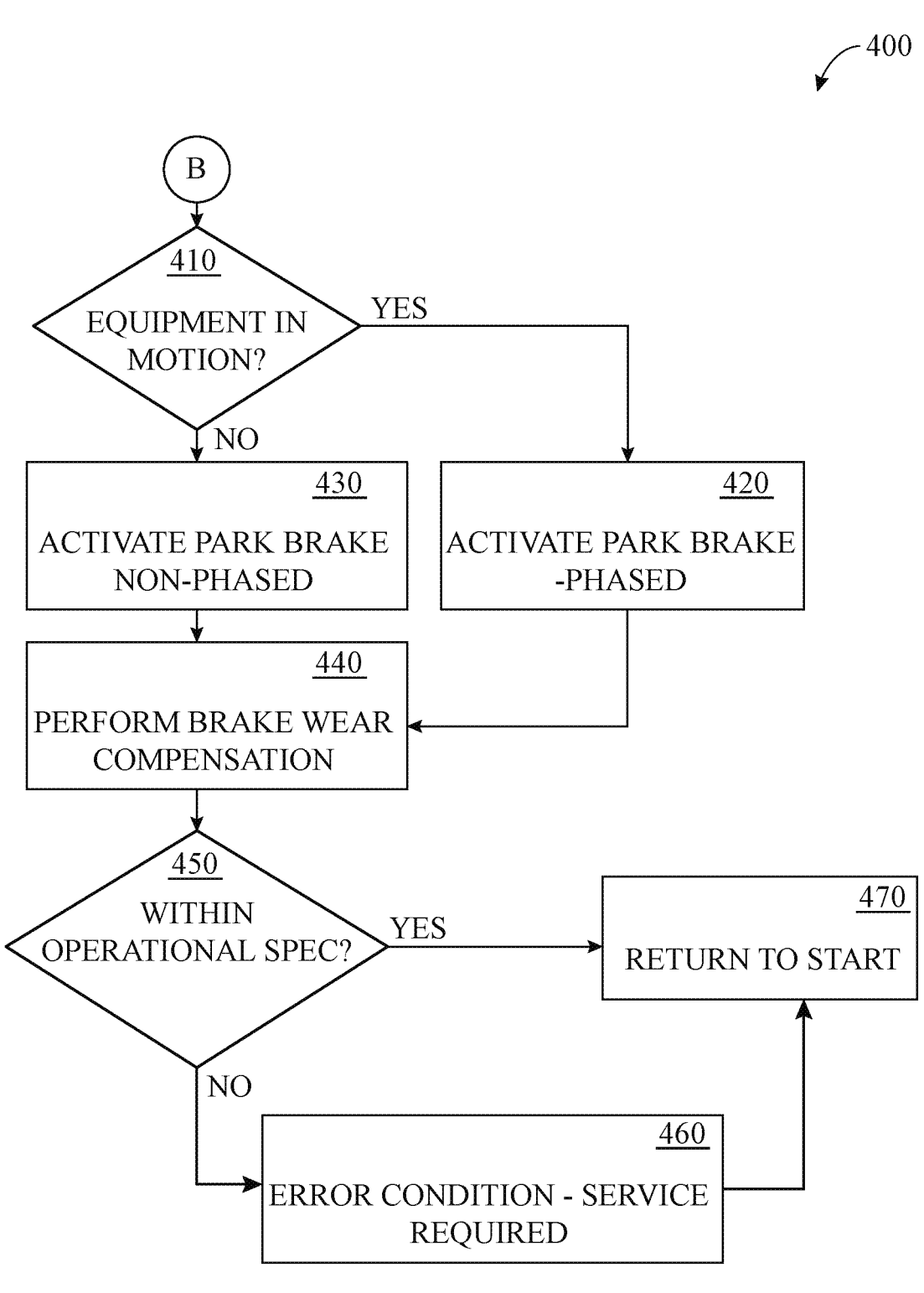
FIG. 4 is a flowchart diagram of a Third Step of the automatic park brake method and system according to FIG. 2, in accordance with the present invention.
Figure 5:
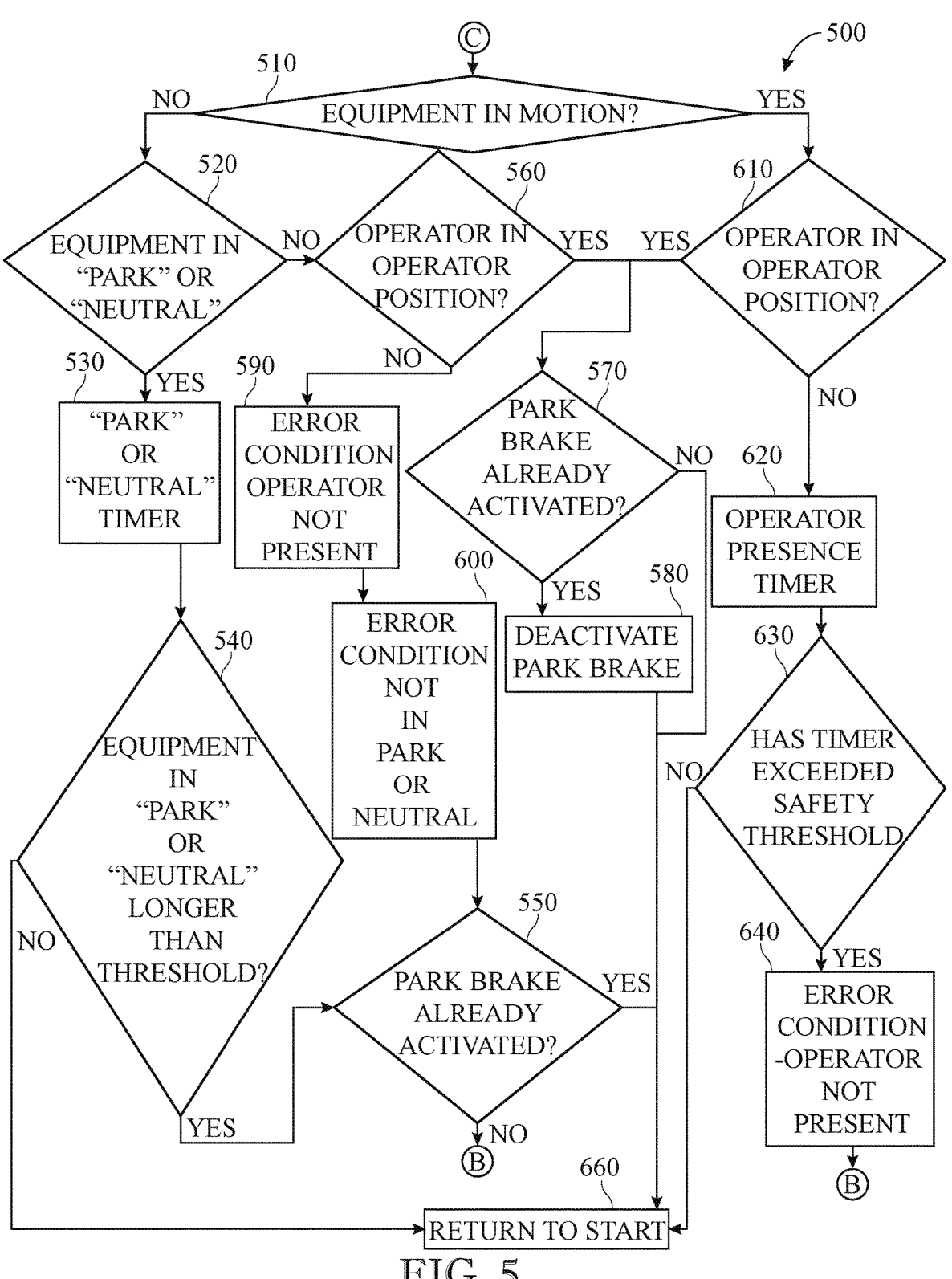
FIG. 5 is a flowchart diagram of a Fourth Step of the automatic park brake method and system according to FIG. 2, in accordance with the present invention.
Figure 6:
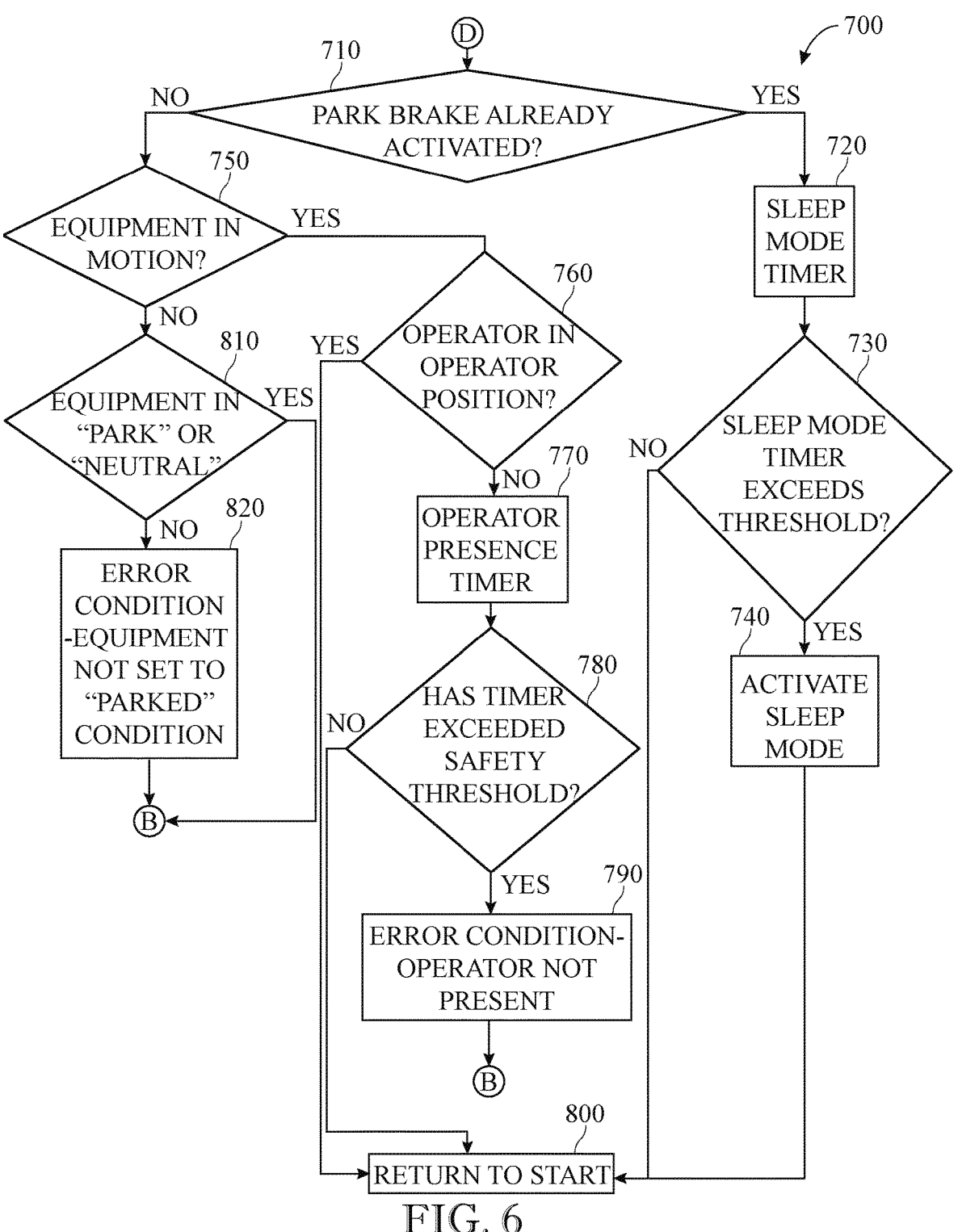
FIG. 6 is a flowchart diagram of a Fifth Step of the automatic park brake method and system according to FIG. 2, in accordance with the present invention.

For purposes of description herein, the terms "upper", "lower", "left", "rear", "right", "front", "vertical", "horizontal", and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Therefore, specific structural and functional details disclosed herein are not to be interpreted as limiting, but merely as a basis for future claims and as a representative basis for teaching one of ordinary skill in the art to variously employ the present invention in virtually any appropriately detailed structure. Further, the terms and phrases used herein are not intended to be limiting; but rather, to provide an understandable description of the invention. It is believed that the invention will be better understood from a consideration of the following description in conjunction with the drawing figures, in which like reference numerals are carried forward. The figures of the drawings are not drawn to scale.

The invention described herein provides an automatic park brake system and an automatic park brake method and system that overcome known disadvantages of those known devices and methods of this general type and that effectively and reliably prevents idle or unattended vehicles from rolling away and causing property damage and personal injury when the operator is not present.

Although the invention is illustrated and described herein as embodied in an automatic park brake method and system, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

The attached figures are incorporated in and form part of the specification and serve to further illustrate various embodiments and explain various principles and advantages all in accordance with the present invention. Moreover, it is believed that the invention will be better understood from a consideration of the following description in conjunction with the drawing figures, in which like reference numerals are carried forward.

Shown throughout the figures, the present invention is directed to an automatic park brake system 100 (also referred to hereinafter as "system 100" or "APB system 100"), and an automatic park brake method 200 (hereinafter "APB method 200" or "method 200"). The system 100 and the method 200 are operably configured to prevent idle or unattended vehicles from rolling away and causing property damage and personal injury. The APB method 200 comprises four general steps which are described in greater detail hereinbelow.

In describing the present invention, the following terms, acronyms, and definitions may be referenced.

APB—Acronym for Automatic Park Brake

APB Actuator—The Automatic Park Brake Actuator. This is the component that will provide actuation force to the Equipment Park Brake. In the Current Design, the APB Actuator is a 12V DC lead screw actuator, with an integral potentiometer to monitor actuation position, and limit switches to prevent current spikes, over extension, and under extension. APB Actuators could take on many forms, including but not limited to, electrical ball screw actuators, hydraulic or pneumatic cylinders, mechanical springs, hydraulic power transmission, electric motor braking, and electrical solenoids.

APB Battery—The power supply for the ABP System. In the Current Design, the APB Battery is a dedicated, stand-alone AGM style battery devoted exclusively to powering the APBC, APB Sensors, and APB Actuators. The APB Harness incorporates a diode to allow charging from the Equipment charging system, but no charge going back to the Equipment. It is necessary to have a dedicated power supply system as the APB System must be capable of Park Brake Activation, even if the Equipment has lost all electrical power. Alternatives to use of a dedicated battery could take on many forms, including but not limited to, relying solely on the Equipment battery to provide power, or use of capacitor(s).

APB Brackets—The system of bracketry required to adapt the APB System to the Equipment.

APB Cable—The cable the Current Design of the APB System actuates, when activating the park brake system.

APB Harness—Electrical wiring associated with the APB System. Electrical conductors connecting the APBC to the APB Actuator and various sensors and other inputs required to operate the APB System.

APB Process—The general process by which the APBC monitors various inputs and outputs and thereby decides to either activate or deactivate the park brake.

APB Sensors—The array of sensors, either supplied with the APB System, or pre-existing on the vehicle, that the APBC monitors.

APB System—The system of components that makes up the automatic park brake system. Current design includes the Automatic Park Brake Controller, the Automatic Park Brake Actuator, the Automatic Park Brake Battery, The Automatic Park Brake Harness, The Automatic Park Brake Sensors, The Automatic Park Brake Cable, and The Automatic Park Brake Brackets.

APBC—Acronym for Automatic Park Brake Controller. Electronic controller that processes all commands for the Automatic Park Brake system. The Current Design utilizes a custom designed and programmed microcontroller to perform this task.

Current Design—Current design of the APB System as offered by Element LLC.

ECS—Equipment control system. Any controller or system of controllers that control the operation of the Equipment and any of its components or subsystems. This can be groupings of individual controllers (for instance engine controller, transmission controller, motor controller, etc.), or an in-vehicle network system. Examples of this include CAN bus, MOST, Flex Ray, and Automotive Ethernet.

Emergency Brake—The braking system on the Equipment, which operates in case an emergency application of braking force is required. The system typically deployed on Equipment is the Equipment Park Brake, however it is possible to have a dedicated emergency-only braking system, which would require separate activation by the APB System. Such an application would require the use of a dedicated APB Actuator; however the same APB Process of emergency brake activation would apply.

Equipment—The industrial machine, typically a self-propelled industrial machine, which the APB System is adapted to (it is possible that this could extend to automotive applications and not necessarily industrial only, although current targets are industrial tractors and commercial delivery vehicles). The terms "equipment" and "vehicle" may also refer to any self-propelled or user-operated equipment, vehicle or other conveyance.

Equipment Park Brake—The pre-existing set of components that comprise the park brake system on the Equipment.

Manual Input—Operator takes some affirmative action to change the state of the APBS or the Equipment.

Operator—The person who is operating the Equipment.

Operator Presence—The operator is present, occupying the operator station. Typically a driver's seat.

Set Point—The specific amount of movement required of the APB Actuator, for the given situation in the APB Process. In the Current Design, these set points are related to full activation and phased activation of the APB Actuator.

Timer—any portion of the Process referring to a Timer, is creating a temporal place holder to monitor elapsed time for a given event.

Wear Set Point—The specific amount of movement of the APB Actuator, associated with the APB System and Equipment Park Brake system requiring service due to wear of the components in these systems.

An exemplary embodiment of the automatic park brake system 100 of the present invention is shown at FIG. 1. Specifically, an exemplary embodiment of the APB System 100 comprises the APBC 110, the APB Actuator 120, the APB Battery 150, and various APB Bracket(s) 140. In addition, the APB Harness, an electrical wiring harness, and APB Sensors, are included, which are not shown in the drawing at FIG. 1.

The APBC 110 commands the APB Actuator 120 to extend and retract, depending on the given situation, governed by the Process. This extension and retraction, in turn, acts to push and pull the APB Cable 130. Retracting the APB Cable 130 activates the Equipment Park Brake System 160. Extending the APB Cable 130 deactivates the Equipment Park Brake System 160.

With continued reference to FIG. 1, the Automatic Park Brake Controller (APBC) 110 is the electronic control unit used in the system 100 which processes all system inputs and carries out commands to the APB Actuator 120. Alternative controllers may include Programmable Logic Controllers, or integration with higher level electronic controllers integral to the Equipment. Certain elements of the Process could even be executed using only electrical relays. The Automatic Park Brake Actuator (APB Actuator) is the component that applies force to the articulating components of the park brake system, which in turn generate braking force. Alternatives include hydraulic cylinders, pneumatic cylinders, electric solenoids, electric motors, fluid power transmission, electronically controlling existing park brake components, requiring no actuator. Alternatives would also include Spring Apply Hydraulic Release "SAHR", Spring Apply Pneumatic Release "SAPR" and other brake systems where the brakes are applied automatically in the event of loss of power. The Automatic Park Brake Cable (APB Cable) transfers force from the APB Actuator to the Equipment Park Brake System. Alternatives include Mechanical linkage(s), Direct actuation of braking mechanisms(s) via direct attachment (no cable or linkage), power transmission through air or hydraulic lines.

The Automatic Park Brake Brackets (APB Brackets) 140 comprises a system of brackets, designed per application, that allows the APB System 100 to be adapted to the Equipment Park Brake System 160. As an alternative, bracketry will typically be required, however it is possible to develop an entirely integrated system which would not require this. The Automatic Park Brake Battery (APB Battery) 150 is the component which provides power for the system of components that comprise the APB System 100. In the preferred embodiment, a dedicated battery is chosen so that power is available to the APB System 100 at all times, even in the event of Equipment total power loss. Alternatives include using the vehicle's primary charging system, Capacitor(s), mechanical energy storage means such as springs, hydraulic pressure accumulation, etc. The Equipment Park Brake System 160 is the system of components that comprises the park brake for the given application. As shown at FIG. 1, the equipment Park Brake System 160 uses a drum brake which is attached to a transmission tail shaft. It is possible that a dedicated park brake system could be provided as an integral part of the Automatic Park Brake System 100. Additionally, it is possible to use the vehicle's primary braking system to achieve the desired functionality of the APB System 100. It is important to note that this system of physical components can take many forms, but they will always ultimately act to either activate or deactivate a vehicle braking mechanism, and that what still applies is the process of application. In other words, the method of the present invention is not limited to the system disclosed herein.

Referring now to FIGS. 2-6, the present invention is directed to an automatic park brake system method 200 (hereinafter "APB method 200" or "method 200"). The system 100 and the method 200 are operably configured to prevent idle or unattended vehicles from rolling away and causing property damage and personal injury. The APB method 200 comprises four general steps which are described in greater detail hereinbelow.

In a First Step 200 (referred to herein as Section 200 and depicted in FIG. 2), the first section of the process is determining if initialization mode is currently active. Initialization is the series of steps that the APB System needs to take upon initial installation or after system maintenance. The purpose of this is to ensure that all APB System and Equipment Park Brake components are properly adjusted and within operational specifications. Generally speaking, the APBC will command the APB Actuator to actuate to a predetermined position, and then will evaluate the amperage or force required to achieve this position. If the forces at the actuation set point are within specification, then the system creates new operating set points and then exits the initialization routine. If the forces are not within specification then the APBC should remain in initialization mode until the service technician resolves APB and Equipment component issues that are causing the error. Step 210 is the start of the APB Process that the APB System follows. All sections of the Process return back to this point once complete. Step 220 asks if the APBC is in Initialization Mode. In the preferred embodiment, Initialization Mode is only active upon power-up of the APBC. Power-up occurs any time the APB Battery is disconnected (which results in complete power loss to the APBC) and is subsequently reconnected at some later time. Other methods for detecting initialization mode could be: Any form of electrical switch connected directly or indirectly to the APBC, or connection of the APBC to a programmer, for example a laptop, tablet, smartphone with a suitable programming application. If the answer to Step 220 is no, proceed to Section 300 (A). If the answer is yes, proceed to Step 230 to Perform Initialization Routine. Initialization will be the scheme by which the APBC initially works with the APB Actuator to determine appropriate actuation set points and forces. In the preferred embodiment, Initialization button placed on APBC must be depressed before any further processing can take place. Once button is pressed, the APB Actuator is commanded to actuate from zero actuation to full actuation. Full actuation is achieved when the set point amperage value is achieved. The actuator then repeats this actuation five times, and an average achieved potentiometer position is calculated. This average potentiometer value is now set as the application set point, and other application set point threshold(s) are calculated based on this. Other possible methods of establishing initial setpoints for an actuator include utilization of a force sensor, such as a strain gage or a load cell, to establish adequate amount of actuator force application, and direct measurement of force or movement of the Equipment park brake components, by any means including electrical contact switches, toggles, limit switches, potentiometers, optical sensors, pressure sensors, either directly or indirectly attached to Equipment park brake system components. Step 240 asks if the initialization routine successfully executed. If any amperage or set point thresholds are outside of limits of actuator movement, then the error light is illuminated. In this case the service technician must physically adjust the actuator cable or replace APB and/or Equipment components as required, to establish correct range of actuator motion, and correct amperage levels, prior to proceeding to the next portion of the process. If the answer is yes, proceed to Step 250 to Exit Initialization Routine. Controller will now set Initialization Mode status to inactive and proceed to the normal Process. If the answer is no, proceed to Step 260 where Error Initialization Is Not Successful. In an exemplary embodiment, the APBC illuminates an error LED placed on the Equipment operator panel and returns to 210 Start, leaving the Initialization Mode active status in place.

As the initialization routine is not a requirement of the process but may be a perfunctory safety check, in some embodiments of the method, the initialization routine may be bypassed and still provide a functioning auto park brake system.

In a Second Step (referred to herein as Section 300 and depicted in FIG. 3), the second section of the Process entails inquiring the status of some fundamental inputs. The first question inquires if the APB System is being manually activated via Operator input. This could be an operator preference, or it could be an emergency scenario. The second question is asking if there is Operator input to deactivate the APB System, i.e., set the park brake to an "off" state. This would be required if the vehicle were stalled or in a maintenance environment. The third question being asked is if the vehicle is turned on, and branches to the larger parts of the process, depending on if the vehicle is on or not. The last question is asking if the APBC is in Sleep Mode. If it is in Sleep Mode the APBC remains in sleep mode and circles back to the Process Start. If not, it proceeds to the next portion of the Process.

Step 310 asks if there has been any Manual Input to activate the Equipment Park Brake System, i.e. is the Operator directly applying a control on the vehicle which is meant to activate the Equipment Park Brake System? The most common utilization of this will be when the operator prefers direct control or the organization has a policy for direct operator input to the system. This can also occur if the Equipment Emergency Brake is being activated. The Current Design monitors this via connection of the APBC to an electrical push button switch connected to the APB Harness, located on the equipment control panel. Detection can also occur via electrical connection of the APBC to any of the following: A switch input, for instance a push button Emergency Brake switch, or through the activation of an emergency stop button on the vehicle; Any form of electrical switch (e.g., Potentiometer, contact switch, limit switch, proximity sensor, magnetic switch, pressure switch), either directly actuated by the operator (for instance a push button or toggle), or via connection to some manual control, for example a foot pedal or hand operated lever; or connection to the equipment control system via APB Harness connection to the ECS. When the aforementioned switches are active, the APBC will activate the APB Actuator regardless of any other inputs to the system. If the answer is yes, proceed to Step 320 to Reset Sleep Mode Timer. The APBC monitors the amount of time that has elapsed since the last sleep mode reset. Later in the Process, once the Equipment is set to "Off" and the park brake is activated, the sleep mode timer is initiated. This is a command to reset the timer for Sleep Mode to zero. Proceed to Section 400 (B). If the answer is no, proceed to Step 330 which asks if there has been any Manual Input to deactivate the Equipment Park Brake System, i.e., is the Operator directly applying a control on the vehicle which is meant to deactivate the Equipment Park Brake System? The most common utilization of this will be when the vehicle is disabled or in a maintenance environment and needs to be moved. This could also be an emergency situation where the vehicle is stalled and must be moved. The Current Design monitors this via connection of the APBC to an electrical push button switch connected to the APB Harness, located on the equipment control panel. Detection can also occur via electrical connection of the APBC to any of the following: A switch input, for instance a push button or toggle "brake override" switch; Any form of electrical switch (e.g., Potentiometer, contact switch, limit switch, proximity sensor, magnetic switch, pressure switch), either directly actuated by the operator (for instance a push button or toggle), or via connection to some manual control, for example a foot pedal or hand operated lever; or connection to the equipment control system via APB Harness connection to the ECS.

If the answer is yes, proceed to Step 340 Reset Sleep Mode Timer. The APBC monitors the amount of time that has elapsed since the last sleep mode reset. Later in the Process, once the Equipment is set to "Off" and the park brake is activated, the sleep mode timer is initiated. This is a command to reset the timer for Sleep Mode to zero. In Step 350 (Deactivate Park Brake), the APBC will command the actuator to the deactivated set point, thereby deactivating the park brake. Step 360 Returns to Start. The Process is concluded and returns to the start.

If the answer is no, proceed to Step 370 which asks if the vehicle is in the "ON" state. Based on if the Equipment is "ON" or "OFF", the automatic park brake branches to two main process sets, as the park brake has distinct operating characteristics based on if the vehicle is in a running state. In the Current Design, "ON" or "OFF" status will be monitored by the APBC via the following means: With most industrial equipment, whether fossil fuel or electrically powered, the main switch will have a voltage output when the switch is set to the "On" or "Start" positions. This output will be directly monitored by the APBC. With some equipment (Predominantly electrically driven equipment), the main control switch will not have such an output and will directly communicate the Equipment ECS. In this case the automatic park brake controller will need to tie in directly with that controller. These controllers typically have a voltage output indicating the vehicle is in the "on" condition. This communication can also be accomplished via the Equipment's networked control system, if so equipped (e.g., CAN Bus system).

If the answer is yes, proceed to Step 380 (Reset Sleep Mode Timer). The APBC monitors the amount of time that has elapsed since the last sleep mode reset. Later in the Process, once the Equipment is set to "Off" and the park brake is activated, the sleep mode timer is initiated. This is a command to reset the timer for Sleep Mode to zero. Proceed to Section 500. If the answer is no, proceed to Step 390 which asks if the APBC has been put into Sleep Mode. If yes, the process loops back to only monitoring the previous three nodes (310), (330), (370). If yes, 394 Return to Start. The Process is concluded and returns to the start. If the answer is no, proceed to Section 500 (D).

In a Third Step (referred to herein as Section 400 and depicted in FIG. 4), this section of the process covers the activation of the APB System. This covers what needs to happen and under what circumstances, when the APBC executes the command to actuate the APB Actuator. The first question that is asked, is if the Equipment is currently moving. If it is not moving, then the APB System can go ahead and fully activate. If the equipment is moving, then the APB System will apply the brake in a phased manner. The reason for this is because many park brake systems, particularly industrial applications, have very powerful park brakes and immediate full application, while moving, can create a dangerous situation, such as throwing the operator out of the operator seat. Immediate application can also damage Equipment components. It is noteworthy, however, that a phased application is not mandatory for this process to function. A possible permutation of this process would simply always apply the park brake in one manner or another. Once the brake has been applied, a break wear compensation is performed. This is a series of calculations the APBC performs, based on APB System inputs which, in turn makes a determination about the state of the APB or Equipment Park Brake system components. If the system is within spec, then no further action is taken and the process returns to start. If the APBC determines that components are not within specification, then an error condition is created and recorded, and then the system proceeds back to the start of the process Note that this compensation routine is a recommended action and not necessarily a must have for the system to operate. In other words a user of the system and method may decide not to run the wear compensation, or may decide to perform this compensation elsewhere in the process. What is fundamentally important is what series of steps is taken, to make a decision to apply the park brake or not. The process of either activating or deactivating a vehicle braking mechanism, may be performed in a series of steps as disclosed herein, which may be performed in any order to accomplish the result.

Step 410 asks if the vehicle is currently moving. The preferred embodiment of the present invention monitors vehicle movement via proximity sensors aimed at moving components of the vehicle driveline, such as the driveshaft u joints. Other means of determining if the vehicle is moving include the use of a hall effect sensor, optical or drive wheel encoder attached to a rotating component of the driveline or the ground. If available, the higher level equipment controller may send an output indicating vehicle movement, in which case this can be monitored by the APBC. If the answer is yes, proceed to Step 420 (Activate Park Brake-Phased). This is the actual application of the park brake holding force by the APB Actuator. Note that Equipment Park Brake systems can be applied with any force, from a light amount up to a predetermined maximum amount of force. The Current Design activates the parking brake by energizing the APB Actuator, which pulls on the APB Cable. The Current Design uses the following approach: The actuator extends progressively, starting with an initial amount of braking force, and ramping up over a series of incremental set points and time increments, up to the maximum activation set point. The position is monitored via potentiometer, integrated into the actuator. Other "while in motion" activation strategies could include: (a) Immediate, partial activation of the park brake. This could occur in the event that the brake is applied while the vehicle is already in motion, or if the brake is powerful enough such that maximum application is not required to hold the vehicle stationary; (b) Phased activation of the park brake.

In the event that the vehicle is in motion and the park brake is activated, the system will activate progressively, starting with an initial amount of braking force, and ramping up (or down), over a series of incremental steps and time increments, up to a predetermined maximum level of force. Note that the rate of application need not be linear, i.e. rate increases and time increments can grow larger or smaller. This will be specific to the exact application, based on the characteristics of the given equipment; and (c) Phased activation of the park brake by varying duty cycle. Phasing activation of park brake by setting activation level to some fixed amount but rapidly turning on and off the brakes, to achieve braking force modulation. This type of application is typically utilized in anti-lock braking systems of automobiles, but could be used in a park brake system as well.

If the answer is no, proceed to Step 430 (Activate Park Brake-Non-Phased). This is the actual application of the park brake holding force by the APB Actuator. Note that Equipment Park Brake systems can be applied with any force, from a light amount up to a predetermined maximum amount of force. The Current Design activates the parking brake by energizing the APB Actuator, which pulls on the APB Cable. The Current Design uses the following approaches: The APBC commands the APB Actuator to extend to a pre-defined, application-specific Set Point. The APBC directly applies voltage to the actuator, reversing voltage polarity depending on the direction of required movement. The position is monitored via potentiometer, integrated into the actuator. Other activation strategies could include: (a) Immediate, partial activation of the park brake. This could occur in the event that the brake is applied while the vehicle is already in motion, or if the brake is powerful enough such that maximum application is not required to hold the vehicle stationary; (b) Phased activation of the park brake. In the event that the vehicle is not in motion and the park brake is activated, the system will activate progressively, starting with an initial amount of braking force, and ramping up (or down), over a series of incremental steps and time increments, up to a predetermined maximum level of force. Note that the rate of application need not be linear, i.e., rate increases and time increments can grow larger or smaller. This will be specific to the exact application, based on the characteristics of the given equipment; and (c) Phased activation of the park brake by varying duty cycle. Phasing activation of park brake by setting activation level to some fixed amount but rapidly turning on and off the brakes, to achieve braking force modulation. This type of application is typically utilized in anti-lock braking systems of automobiles but could be used in a park brake system as well.

Step 440 (Perform Brake Wear Compensation) is the process by which the APBC ensures that the Equipment Park Brake system and the APB System are within safe operational specifications. As the Equipment Park Brake System wears, braking force can diminish over time. Components that wear are typically cables, brake pads and shoes, and brake discs and drums. As these wear, the amount of actuation of the equipment's park brake components, to achieve a given amount of braking force, will generally increase. Other components that can wear include hydraulic hoses, hydraulic seals, rods, brackets, springs, electrical actuators and solenoids. The Current Design performs Park Brake Calibration in the following manner: The APBC directly monitors the amount of amperage being sent to the actuator. The APBC calculates and records the running average of amperage required for the actuator to achieve the applied set point. If the running average application set point current is within limits, no changes are required, and the calibration is complete. If the amperage drops below a threshold value, this is an indication that brake system wear has occurred, in which case the actuator will extend further until the required amperage is achieved, and a new application set point will be set. As long as the running average of amperage is below the threshold value, this sequence will repeat on every application of the park brake, up until the running average application set point current is back within limits. If the amperage increases above a threshold value, then it is an indicator that the actuator itself is wearing and needs servicing. In this case the service brake light will be illuminated. Other monitoring scenarios could include directly monitoring amount of force applied to the brakes via a load cell placed in line with the actuator. Monitoring of wear components can also occur via electrical connection of the APBC to (a) Electrical switch connected directly or indirectly to any of the moving elements of the parking brake system (e.g., Potentiometer, contact switch, limit switch, proximity sensor, magnetic switch, pressure switch) on some moving component of the park brake system (e.g. Cable, bracket, lever, brake pad or shoe); (b) Detection via connection to the vehicle's networked control system (ex. CAN Bus); or (c) Connection to the equipment control system via APB Harness connection to the ECS.

Step 450 asks if the APB System and/or Equipment Park Brake System components are within operational specifications. If the answer is no, proceed to Step 460 (Error Condition-Service Required). In the Current Design, in the event that the new application set point is outside of allowable service limits, an error is recorded. This specific error condition can indicate negligence of equipment maintenance and is thus permanently recorded in the APBC. In the current version of the system, the APBC illuminates an LED error light that is placed on the Equipment control panel. Other approaches to notifying the operator could include: producing an audible warning, or a combination of audible warning and error light, or placing the vehicle in a "limp home" mode. This would typically require more sophisticated means of communicating with the equipment main control systems. This could be a direct wired input to the equipment's control system, or communication over the vehicle's networked control system (e.g., CAN Bus). If the answer is yes, proceed to Step 470 (Return to Start). The Process is concluded and returns to the start.

In a Fourth Step (referred to herein as Section 500 and depicted in FIG. 5), this section of the process covers what happens with the APB System if the vehicle is in the "On" state (determination made in section 300 of the Process). The first question asked is if the Equipment is in a state of motion. Step 510 asks if the vehicle is currently moving. The Current Design monitors vehicle movement via proximity sensors aimed at moving components of the vehicle driveline, such as the driveshaft u joints. Other means of determining if the vehicle is moving include the use of a hall effect sensor, optical or drive wheel encoder attached to a rotating component of the driveline or the ground. If available, the higher-level equipment controller may send an output indicating vehicle movement, in which case this can be monitored by the APBC. If the answer is yes (i.e., equipment is in motion), the first check that the APBC will make is if the operator is in the operator position. This is of huge importance because any time the vehicle is moving and the operator is not in the operator position this means that the vehicle is likely adrift and not in control and is one of the chief reasons this system was developed. Step 610 asks if the operator is in the operator's position. This is typically going to be the main person in control of the vehicle, aka the driver. The Current Design of the APBC will monitor voltage output of the seat switch, which will be integrated with the equipment's operator switch. If no seat switch is present, a proximity sensor, pointed at the operator position, will be utilized. Other sensors to monitor operator presence may be utilized, including proximity sensor, infrared sensor, "dead man" switches, or tethers affixed to the operator.

If the answer is no (i.e., operator is not in operator position), proceed to Step 620 (Operator Presence Timer). This timer monitors duration of time that operator is not present in operator position. This is meant to act as a small buffer that occurs before park brake activation occurs. This is needed, for example, if the operator shifts in the seat due to some discomfort, or if the equipment rides over some large bump which temporarily displaces the Operator, and in this case the APB should not immediately activate. In the Current Design, the APBC sets an internal timer and monitors how long the operator has not been in the operator position. In effect, this step is establishing a time buffer between the operator not being present and actual application of the brake. This is to take into account if the operator shifts in the seat, or perhaps hits a bump in the road, and results in a momentary signal indicating that the operator is not present.

Step 630 asks if the Operator Presence Timer has exceeded a threshold value. The Current Design APBC Operator Presence Timer threshold is set at one second. If no (i.e., operator presence timer has not exceeded safety threshold), proceed to Step 660 (Return to Start). APBC takes no further action and returns to the Start of the Process. If yes (i.e., operator presence timer has exceeded safety threshold), proceed to Step 640 (Error Condition Operator Not Present). In the event that the operator is not present and the vehicle is in motion, this is an indication that the operator has been ejected from the vehicle or has otherwise not in the control position of the vehicle for longer than the Operator Presence Timer threshold. Proceed to Section 400 (B). If no (i.e., equipment is not in motion), proceed to Step 520 which asks if vehicle's gear or direction selector is set to park position or neutral position. The Current Design of the APBC senses this via direct wired connection to the equipment gear selector position voltage output. Other methods of detection can include: Voltage output on the vehicle controller, via direct wiring; Mechanically activated electrical switch (e.g., contact switch, limit switch, proximity sensor, magnetic switch, pressure switch) on some moving component of the transmission's mechanical shifting linkage; and Detection via connection to the vehicle's networked control system (ex. CAN Bus). If yes (i.e., equipment is in "Park" or "Neutral"), proceed to Step 530 ("Park" or "Neutral" Timer). The APBC monitors how long the vehicle has been placed in a "Park" or "Neutral" state. In the process of shifting from Drive to Reverse, for example, the vehicle will be momentarily dwell neutral, prior to being placed Reverse. The APBC should not immediately Activate Park Brake during this dwell time. Other embodiments could ignore this momentary condition and actuate the park brake any time the Equipment is in neutral regardless of how long. In some embodiments, the park brake may be configured to be actuated while in park, or any Non-Motion/driven direction, such as, for example without limitation, "forward, reverse", different gears in forward/reverse. In a nonlimting example, some tractors may just have arrows indicating vehicle direction and wont refer to "park, neutral, drive, reverse, or the like.

Step 540 asks if the "Park" or "Neutral" Timer has exceeded a threshold value. In the Current Design, the threshold is set to 0.5 seconds though this may vary in alternate embodiments. In the event that the vehicle has a different style of gear selection, for example push buttons to activate different gears, then the delay is un-necessary and the threshold timer would be set to zero. If no (i.e., neutral timer does not yet exceed threshold), proceed to Step 660 (Return to Start). APBC takes no further action and returns to the Start of the Process. If yes (i.e, neutral timer exceeds threshold), proceed to Step 550 which asks if the vehicle's parking brake has already been applied. The Current Design monitors position of the actuator, via potentiometer which is integral to the electrical actuator. Detection can also occur via electrical connection of the APBC to (a) Electrical switch connected directly or indirectly to any of the moving elements of the parking brake system (e.g., Potentiometer, contact switch, limit switch, proximity sensor, magnetic switch, pressure switch) on some moving component of the park brake system (e.g., Cable, bracket, lever, brake pad or shoe); (b) Detection via connection to the vehicle's networked control system (ex. CAN Bus); or (c) Voltage output on the vehicle controller, via direct wiring. If the answer is no (i.e., Park Brake Not Already Activated), proceed to Process 400 (B). If yes (i.e., Park Brake is Already Activated), proceed to Step 660 (Return To Start). If no (i.e., equipment in not in "Park" or "Neutral"), proceed to Step 560 which asks if the operator is in the operator's position. This is typically going to be the main person in control of the vehicle, aka the driver. The Current Design of the APBC will monitor voltage output of the seat switch, which will be integrated with the Equipment's seat. If no seat switch is present, a proximity sensor, pointed at the operator position, will be utilized. Other sensors to monitor operator presence may be utilized, including proximity sensor, infrared sensor, "dead man" switches, or tethers affixed to the operator. If the answer is no (i.e., Operator is NOT in Operator Position), proceed to Step 590 (Error Condition Operator Not Present). Vehicle not in motion, but left "ON" and in a drive gear, Operator has left the Operator Position. An Error Condition is created, illuminating an LED on the Operator Panel. Step 600 displays an error condition as equipment is not in "Park" or "Neutral". The Operator left the Equipment while stationary, in a driven gear. An Error Condition is created, illuminating an LED on the Operator Panel. Step 550 asks if the vehicle's parking brake has already been applied. The Current Design monitors position of the actuator, via potentiometer which is integral to the electrical actuator. Detection can also occur via electrical connection of the APBC to (a) Electrical switch connected directly or indirectly to any of the moving elements of the parking brake system (e.g., Potentiometer, contact switch, limit switch, proximity sensor, magnetic switch, pressure switch) on some moving component of the park brake system (e.g., Cable, bracket, lever, brake pad or shoe); (b) Detection via connection to the vehicle's networked control system (ex. CAN Bus); or (c) Voltage output on the vehicle controller, via direct wiring. If no (i.e., Park Brake is NOT Already Activated), proceed to Process 400 (B). If yes (i.e., Park Brake IS Already Activated), proceed to Step 660 (Return To Start). If yes, (i.e., Operator IS in Operator Position), proceed to Step 570 (Park Brake Already Activated?). The difference here is that the vehicle is in a forward or reverse gear, with the operator present, therefore the park brake should be turned off If Park Brake is not Already Activated, no further action is required. If Park Brake is Already Activated, Deactivation is required. If the answer is no (i.e., Park Brake is NOT Already Activated), proceed to Step 660 (Return to Start). If yes (i.e., Park Brake IS Already Activated), proceed to Step 580 (Deactivate Park Brake). The APBC will command the actuator to the deactivated set point, thereby deactivating the park brake. Proceed to Step 660 (Return to Start).

In a Fifth Step (referred to herein as Section 700 and depicted in FIG. 6), this section of the process covers what happens with the APB System if the vehicle is in the "Off" state, and is not in Sleep Mode (determination made in section 300 of the Process). Step 710 asks if the vehicle's parking brake has already been applied. The Current Design monitors position of the actuator, via potentiometer which is integral to the electrical actuator. Detection can also occur via electrical connection of the APBC to (a) Electrical switch connected directly or indirectly to any of the moving elements of the parking brake system (e.g., Potentiometer, contact switch, limit switch, proximity sensor, magnetic switch, pressure switch) on some moving component of the park brake system (e.g. Cable, bracket, lever, brake pad or shoe); (b) Detection via connection to the vehicle's networked control system (ex CAN Bus); or (c) Voltage output on the vehicle controller, via direct wiring. If yes (i.e., Park Brake IS already Activated), proceed to Step 720 (Sleep Mode Timer) The APBC monitors how long the vehicle has been "Off", with the park brake already applied. Step 730 asks if the Sleep Mode Timer has exceeded a threshold value. In the Current Design, the threshold is set to 5 minutes. This threshold could be any longer or shorter time interval. If the Sleep Mode Timer is below threshold, no further action is taken and the controller continues to the end of process. If the Sleep Mode Timer exceeds threshold, then the Activate Sleep Mode process step is triggered. If no (i.e., Sleep mode timer has NOT exceeded threshold), proceed to Step 800 (Return to Start). APBC takes no further action and returns to the Start of the Process. If yes (i.e., Sleep mode timer HAS exceeded threshold), proceed to Step 740 (Activate Sleep Mode). This step sets the APBC in a reduced power consumption state, for the purpose of conserving energy of the APB Battery. In the Current Design, while in Sleep Mode, the APBC reduces the processor frequency to once every 5 seconds. While in Sleep Mode, the only processes monitored are manual input processes and vehicle "On" or "Off" status. Other types of "Sleep Mode" could power down the APBC entirely, could turn on the controller only intermittently, or could run any number of steps in the process but only in some reduced power consumption mode. Proceed to Step 800 (Return to Start). APBC takes no further action and returns to the Start of the Process. If no (i.e., Park Brake is NOT already Activated), proceed to Step 750 which asks if the vehicle is currently moving. The Current Design monitors vehicle movement via proximity sensors aimed at moving components of the vehicle driveline, such as the driveshaft u joints. Other means of determining if the vehicle is moving include the use of a hall effect sensor, optical or drive wheel encoder attached to a rotating component of the driveline or the ground. If available, the higher-level equipment controller may send an output indicating vehicle movement, in which case this can be monitored by the APBC. If yes (i.e., Equipment IS in motion), proceed to Step 760 which asks if the operator is in the operator's position. This is typically going to be the main person in control of the vehicle, aka the driver. The Current Design of the APBC will monitor voltage output of the seat switch, which will be integrated with the equipment's seat. If no seat switch is present, a proximity sensor, pointed at the operator position, will be utilized. Other sensors to monitor operator presence may be utilized, including proximity sensor, infrared sensor, ultrasonic sensor, "dead man" switches, or tethers affixed to the operator. If yes (i.e., Operator IS in Operator position), proceed to Step 800 (Return to Start). APBC takes no further action and returns to the Start of the Process. If the answer is no (i.e., Operator is NOT in Operator position), proceed to Step 770 (Operator Presence Timer). This timer monitors duration of time that operator is not present in operator position. This is meant to act as a small buffer that occurs before park brake activation occurs. This is needed, for example, if the operator shifts in the seat due to some discomfort, or if the equipment rides over some large bump, and in this case the APB should not immediately activate. In the Current Design, the APBC sets an internal timer and monitors how long the operator has not been in the operator position.

Step 780 asks if the Operator Presence Timer has exceeded a threshold value and if so the APB Actuator will be activated. The Current Design APBC Operator Presence Timer threshold is set at one second. If no (i.e., Timer has NOT exceeded threshold), proceed to Step 800 (Return to Start). APBC takes no further action and returns to the Start of the Process. If yes (i.e., Timer HAS exceeded threshold), proceed to Step 790 (Error Condition Operator Not Present). In the event that the operator is not present and the vehicle is in motion, this is an indication that the operator has been ejected from the vehicle or has otherwise not in the control position of the vehicle for longer than the Operator Presence Timer threshold. In this case, the park brake application sequence will be deployed. Proceed to Section 400 (B). If no (i.e., Equipment is NOT in motion), proceed to Step 810 which asks if vehicle's gear or direction selector is set to park position or neutral position. The Current Design of the APBC senses this via direct wired connection to the equipment gear selector position voltage output. Other methods of detection can include: Voltage output on the vehicle controller, via direct wiring; Mechanically activated electrical switch (e.g. contact switch, limit switch, proximity sensor, magnetic switch, pressure switch) on some moving component of the transmission's mechanical shifting linkage; and Detection via connection to the vehicle's networked control system (ex. CAN Bus). If no (i.e., Equipment NOT in "Park" or "Neutral"), proceed to Step 820 (Error Condition-Equipment Not Set to "Parked" Condition). The APBC creates an error message to notify the operator that the gear selector has not been placed in the "parked" position. In the Current Design, the APBC turns on an error light that is placed on the vehicle control panel. Other approaches to notifying the operator could include: producing an audible warning, or a combination of audible warning and error light; or preventing the vehicle from starting again until the gear selector is in the correct position. This would typically require more sophisticated means of communicating with the equipment main control systems. This could be a direct wired input to the equipment's control system, or communication over the vehicle's networked control system (e.g., CAN Bus). Proceed to Section 400 (B). If yes (i.e., Equipment IS in "Park" or "Neutral"), proceed to Section 400 (B).

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features In some embodiments the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method configured to prevent an idle or unattended vehicle from rolling away and causing property damage and/or personal injury, the method comprising:

providing an automatic park brake system (APB system) including:

an automatic park brake controller (APBC);

an automatic park brake actuator (APB actuator) having a first retracted APB actuator position and a second extended APB actuator position, the APB actuator being configured to extend in response to a first command from the APBC from the first retracted APB actuator position to the second extended APB actuator position, and configured to retract in response to a second command from the APBC from the second extended APB actuator position to the first retracted APB actuator position;

an automatic park brake cable (APB cable) operably connected to the APB actuator, the APB cable being configured to be pushed and pulled by and in response to the movement of the APB actuator between a first retracted APB cable position and a second extended APB cable position;

an equipment park brake system operatively connected to the APB cable, wherein the equipment park brake system is configured to be activated and deactivated in response to movement of the APB actuator, wherein the equipment park brake system is activated in response to movement of the APB actuator from the second extended APB cable position to the first retracted APB cable position, and the equipment park brake system is configured to be deactivated in response to movement of the APB actuator from the first retracted APB cable position to the second extended APB cable position;

an automatic park brake battery (APB Battery) configured to provide power to the automatic park brake system;

wherein the automatic park brake controller (APBC) comprises an electronic control unit configured to process all inputs of the automatic park brake system (APB system) and carry out a plurality of commands to the automatic park brake actuator (APB actuator);

wherein the automatic park brake actuator (APB actuator) is configured to apply force to a plurality of articulating components of the system, which in response actuate the equipment park brake system to generate a braking force;

a plurality of automatic park brake brackets (APB brackets) configured to support the plurality of articulating components of the system;

wherein the plurality of automatic park brake brackets is configured to adapt the plurality of articulating components of the system to the equipment park brake system;

wherein the plurality of articulating components supported by the plurality of automatic park brake brackets comprises the automatic park brake actuator and the automatic park brake cable;

wherein the automatic park brake cable (APB Cable) is configured to transfer force from the APB Actuator to the Equipment Park Brake System; and wherein the equipment park brake system comprises a drum brake configured for attachment to a transmission tail shaft of a vehicle;

installing the automatic park brake system in a vehicle;

starting the automatic park brake system by initializing (starting) the automatic park brake system following an installation or a maintenance of the automatic park brake system to ensure the automatic park brake system is properly adjusted and operating within a set of operational specifications;

determining a status of a plurality of fundamental inputs, the plurality of fundamental inputs comprising:

whether the automatic park brake system is being manually activated via an operator input, whether there is an operator input to deactivate the automatic park brake system and set the equipment park brake system to an "off" state;

whether the vehicle is turned on or off; and whether the automatic park brake controller (APBC) is in "Sleep Mode":

if the automatic park brake controller is in sleep mode, the automatic park brake remains in sleep mode and the automatic park brake system returns to the step of starting the automatic park brake system; and if the automatic park brake controller is not in sleep mode, the automatic park brake system proceeds to a next step of the method; and activating the automatic park brake system (APB system), by execution of a command from the automatic park brake controller (APBC) to actuate the automatic park brake actuator (APB actuator) by:

determining whether the vehicle is in motion:

if the vehicle is in motion activating the equipment park brake system in a phased manner, and if the vehicle is not in motion activating the equipment park brake system in a non-phased manner;

after the brake has been applied, performing a brake wear compensation; and determining whether a brake maintenance service is needed;

if the vehicle is on, monitoring the vehicle by determining whether the vehicle is in motion:

if it is determined the vehicle is in motion;

confirming whether the vehicle operator is in an operator position and activating an operator presence timer if the operator is not present;

if the operator presence timer detects an absence of the operator that has not exceeded a predetermined threshold, the system will return to the step of starting the automatic park brake system; and if the operator presence timer detects an absence of the operator which has exceeded the predetermined threshold, the system indicates an error condition comprising an operator is not present;

following the error condition comprising the operator is not present, the system follows the steps for activating the automatic park brake system (APB system);

if it is determined the vehicle is not in motion:

determining whether the vehicle is in park or neutral gear;

if the vehicle is in park or neutral gear, activating a park or neutral timer configured to monitor an amount of time the vehicle remains in park or neutral gear:

if the park or neutral timer does not exceed a predetermined threshold of time, the automatic park brake system will take no further action; and if the park or neutral timer detects an amount of time which exceeds the predetermined threshold, the system indicates the vehicle has been in park or neutral longer than the predetermined threshold and determines whether the equipment park brake has already been applied:

if the equipment park brake has not yet been applied, the system follows the steps for activating the automatic park brake system; and if the equipment park brake has already been applied, the system returns to the step of starting the automatic park brake system;

if the vehicle is not in park or neutral gear, confirming whether the vehicle operator is in an operator position;

if the operator is present, the system determines whether the park brake has been activated:

if the park brake has been activated, the system will deactivate the park brake and the system will return to the step of starting the automatic park brake system; and if the park brake has not been activated, the system will return to the step of starting the automatic park brake system; and if the operator is not present:

an error condition that the operator is not present and an error condition that the vehicle is not in park or neutral will be displayed by the system on a system operator panel;

the system determines whether the park brake has been activated and if the park brake has not yet been applied, the system follows the steps for activating the automatic park brake system;

the system determines whether the park brake has been activated and if the park brake has already been applied, the system will return to the step of starting the automatic park brake system.

2. The method of claim 1 further comprising:

the system determining the vehicle is in an "off" state and the vehicle is not in sleep mode;

after determining the vehicle is in an "off" state and is not in sleep mode, the system determining whether the park brake has been activated;

if the park brake has been applied, the system monitoring by a sleep mode timer how long the vehicle has been "off" with the park brake already applied:

if the sleep mode timer is below a threshold value, the system taking no further action; and if the sleep mode timer has exceeded the threshold, the system activating a sleep mode process configured to enable operation of the system in a reduced power consumption state to conserve energy of the automatic park brake battery;

if the park brake has not been applied, the system determining whether the vehicle is currently moving;

if it is determined the vehicle is in motion:

determining whether the vehicle operator is in an operator position:

if the operator is in the operator position, the system taking no further action and returning to the step of starting the automatic park brake system; and if the operator is not in the operator position and the presence timer detects an absence of the operator has not exceeded a predetermined threshold, the automatic park brake system will take no further action and the system will return to the step of starting the automatic park brake system; and if the operator presence timer detects an absence of the operator which has exceeded the predetermined threshold, the system indicates an error condition comprising an operator is not present and following an error condition comprising an operator is not present, the system follows the steps for activating the automatic park brake system (APB system);

if it is determined the vehicle is not in motion:

determining whether the vehicle is in park or neutral gear;

if the vehicle is not in a park or neutral gear, indicating an error condition that the vehicle is not in a park or neutral gear, indicating an error condition that the vehicle is not set to a parked condition, and the system following the steps for activating the automatic park brake system (APB system); and if the vehicle is in a park or neutral gear, the system returning to and following the step of activating the automatic park brake system (APB system).

3. The method of claim 2 wherein the step of initializing the automatic park brake system comprising an initialization routine comprising one or more of the following steps:

determining if an automatic park brake system initialization mode is currently active;

if the initialization mode is active:

the automatic park brake controller (APBC) commanding the automatic park brake actuator (APB actuator) to actuate to a predetermined position and evaluating one or more of an amperage or a force required to achieve the predetermined position;

if the amperage and/or the force at the predetermined position are within the set of operational specifications, the system creating a set of operating set points associated with the predetermined position and exiting the initialization mode; and if an automatic park brake system error exists wherein the amperage and/or the force at the predetermined position are not within the set of operational specifications:

the automatic park brake controller remaining in the initialization mode until a service technician resolves an automatic park brake system issue causing the error; and after the automatic park brake system issue causing the error is resolved, the initialization mode is repeated.

* * * * *